United States Patent [19]

Nipoti et al.

[11] Patent Number: 4,651,864
[45] Date of Patent: Mar. 24, 1987

[54] APPARATUS FOR ARRANGING CONTAINERS HORIZONTALLY AND IN SEQUENCE

[75] Inventors: Paolo Nipoti; Franco Priori, both of Bologna, Italy

[73] Assignee: Azionaria Costruzioni Macchine Automatiche (A.C.M.A.), Bologna, Italy

[21] Appl. No.: 721,732

[22] Filed: Apr. 10, 1985

[30] Foreign Application Priority Data

Apr. 19, 1984 [IT] Italy ................................ 3430 A/84

[51] Int. Cl.$^4$ ...................... B65G 17/36; B65G 47/14; B65G 47/24; B65G 47/82
[52] U.S. Cl. ................... 198/397; 198/398; 198/399
[58] Field of Search ............... 198/398, 408, 393, 396, 198/399, 592, 397; 221/156, 157, 161, 162

[56] References Cited

U.S. PATENT DOCUMENTS

| 398,651 | 2/1889 | Peters | 198/397 |
|---|---|---|---|
| 1,602,716 | 10/1926 | Smith | 198/398 |
| 1,733,667 | 10/1929 | Lahr et al. | 198/399 |
| 2,212,702 | 8/1940 | Scott | 198/592 |
| 2,825,489 | 3/1958 | Batchelder | 221/162 |
| 3,031,059 | 4/1962 | Ingham, Jr. | 198/398 |
| 3,556,281 | 1/1971 | Margaroli | 198/393 |
| 3,624,773 | 11/1971 | Krooss | 198/397 |
| 3,710,922 | 1/1973 | Lanphere et al. | 198/398 |
| 3,730,325 | 5/1973 | Goodwin | 198/398 |
| 3,746,144 | 7/1973 | Englert | 198/592 |
| 3,811,551 | 5/1974 | Eddy | 221/157 |
| 3,835,985 | 9/1974 | Johnson | 198/398 |
| 3,868,012 | 2/1975 | Kinsley | 198/396 |
| 4,014,460 | 3/1977 | Bryan, Jr. | 221/156 |
| 4,042,098 | 8/1977 | D'Agnolo et al. | 198/393 |
| 4,099,609 | 7/1978 | Kieronski et al. | 198/399 |
| 4,471,865 | 9/1984 | Johnson | 198/408 |

FOREIGN PATENT DOCUMENTS

| 65466 | 11/1982 | European Pat. Off. | 198/393 |
|---|---|---|---|
| 2421049 | 11/1974 | Fed. Rep. of Germany | 198/396 |
| 2383860 | 11/1978 | France | 198/398 |
| 27903 | of 1908 | United Kingdom | 198/591 |
| 379466 | 7/1973 | U.S.S.R. | 198/398 |
| 582935 | 12/1977 | U.S.S.R. | 198/398 |
| 655623 | 4/1978 | U.S.S.R. | 198/396 |

Primary Examiner—Joseph E. Valenza
Assistant Examiner—Daniel R. Alexander
Attorney, Agent, or Firm—Alan N. McCartney

[57] ABSTRACT

Apparatus for arranging containers horizontally and in sequence comprises a hopper to which loose containers are fed, an elevator with pick-up teeth defining seatings on which, on the ascending branch of the elevator, containers are disposed in a horizontal position and maneuvered by an associated pushing device, and a drum near the top of the elevator containing housings moved in phase with the teeth so that the containers can be transferred from one to the other.

The bottom of the hopper comprises a conveyor belt which conveys containers towards the foot of the ascending branch. Rotating arms staggered either angularly or heightwise below the top of the branch near the drum are placed to intercept between successive teeth of the ascending branch so as to either lay down or eject from the elevator containers carried by the pick-up teeth in incorrect positions.

7 Claims, 15 Drawing Figures

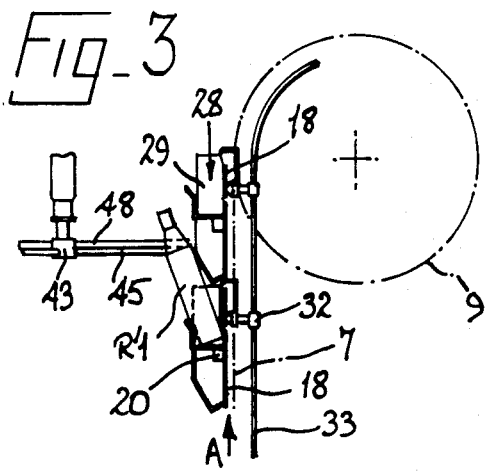
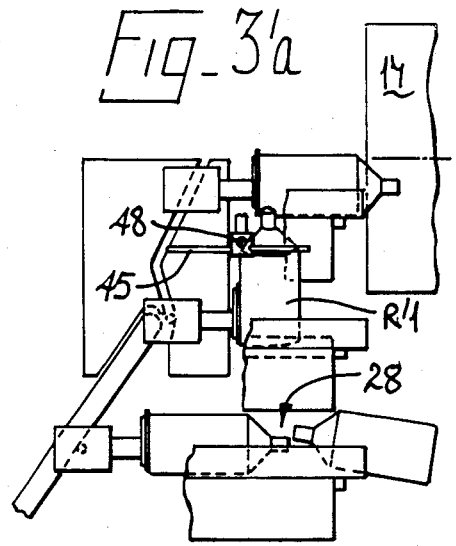
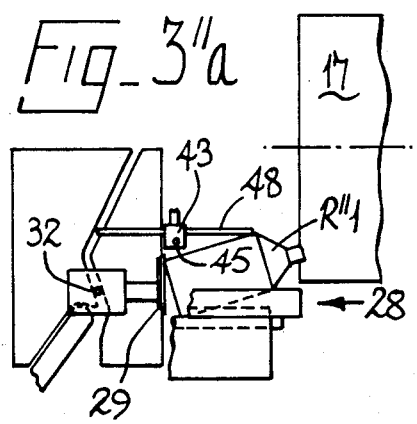
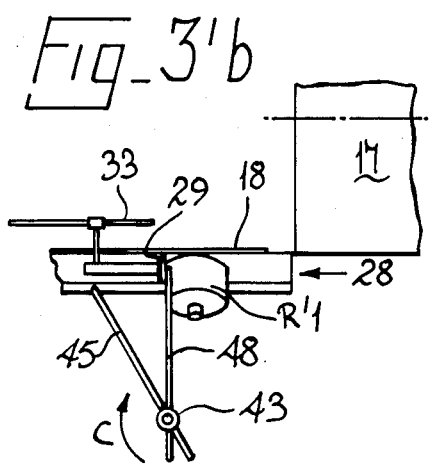
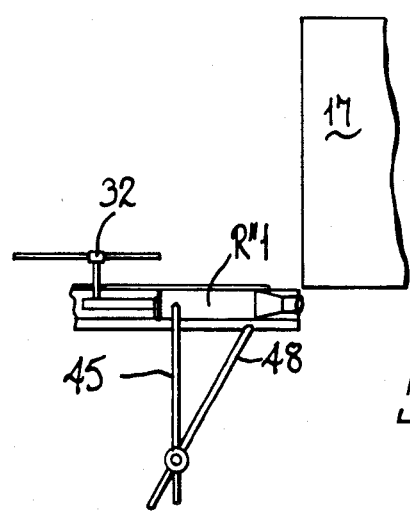

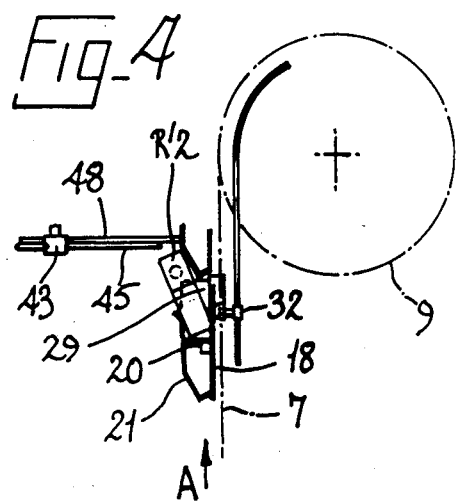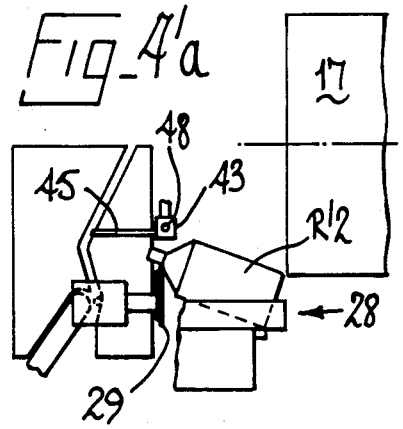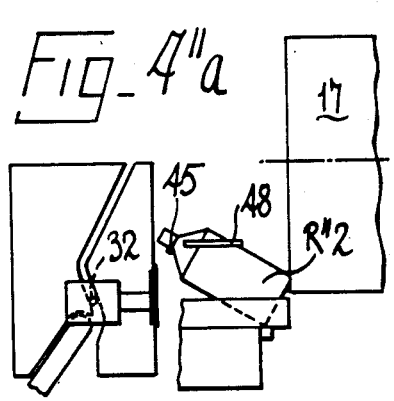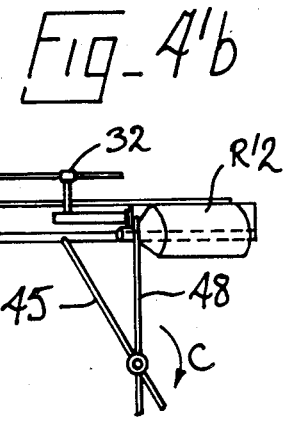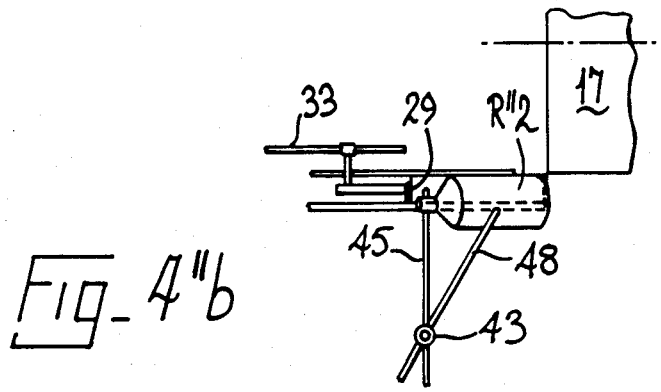

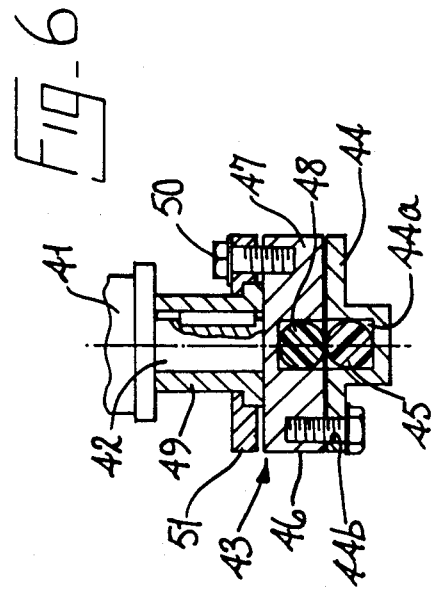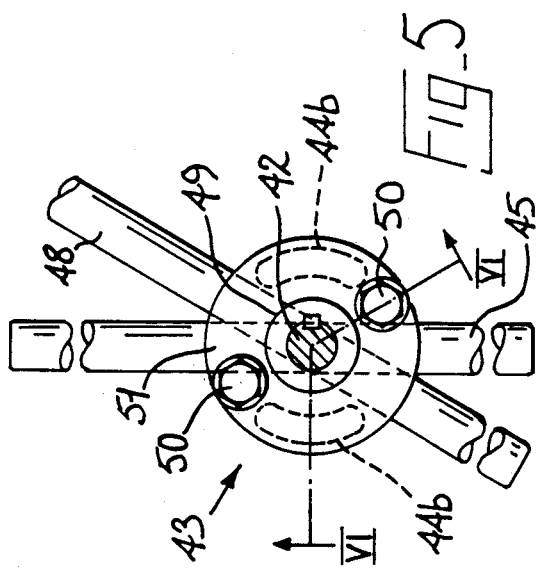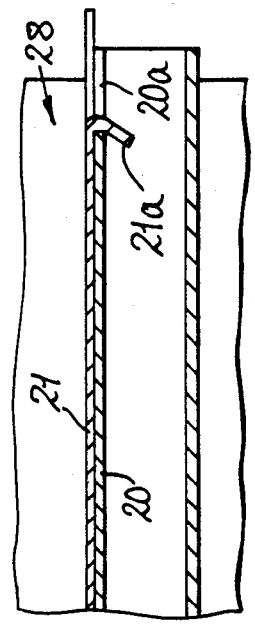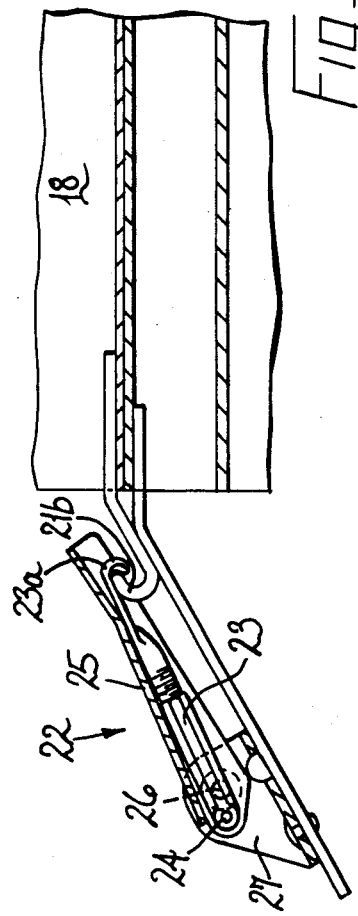

APPARATUS FOR ARRANGING CONTAINERS HORIZONTALLY AND IN SEQUENCE

FIELD OF THE INVENTION

This invention is concerned with apparatus for arranging elongated containers such as bottles, phials and the like, horizontally and in sequence.

BACKGROUND OF THE INVENTION

In plants, in which liquids of various kinds are bottled in elongated plastic containers, the containers are fed—empty and randomly—into a hopper. Emerging from this hopper are one or two continuous conveyors, so-called elevators, operating continuously and having successive pick-up teeth, which have seatings in which two or more of these containers can be accommodated in horizontal parallel positions. Whilst the active branch of the elevator is ascending a pushing device (one arranged in each seating) manoeuvres the container up to one end of the pick-up tooth (ejecting therefrom any other container(s) which there may be) and then feeds it into a housing in a drum; from this drum, which rotates near to and in phase with the top of the elevators, the horizontal containers are then conveyed towards devices which manoeuvre them into a vertical position with their necks uppermost and then on towards devices which fill them and seal them.

Heretofore, for containers of restricted cross-section, the active branch of the conveyor has followed initially a path on which containers were conveyed substantially horizontally followed by a path where they were conveyed substantially vertically. It is the horizontal section of the conveyor which initially receives the containers from the hopper and, by suitably controlling how the containers are fed in, a satisfactory pick-up of the containers by the teeth of the elevator is achieved. However, the total distance travelled along the elevator is rather long and therefore it has a large number of pick-up teeth and associated pushing devices: consequently the elevator is expensive, having a significant economic effect on the bottling plant as a whole.

On the other hand, in the case of containers with a relatively larger cross-section, the active (or ascending) branch of the elevator only comprises one section which is inclined close to the vertical; at the point where the chute at the bottom of the aforesaid hopper meets the foot of this inclined section, the pick-up operation becomes something of a problem: in fact, although it should be possible to ensure that containers are picked up by supplying a large number of these containers which the chute then piles up against the foot of elevator, it has been found that the greater the number of these containers, the more the elevator churns them about instead of picking them up. Along the most vertical course of the active branch of the elevator there is also incorporated a device for dealing with containers which have been picked up by the pick-up teeth, but which are lodged in an incorrect position which is able either to eject these containers from the elevator or to make them lie in the correct position. However such devices currently used handle the containers so roughly that, if they have thin walls, they are often irreparably damaged, but nevertheless are returned to the hopper becoming jumbled up with the other undamaged containers.

OBJECTS OF THE INVENTION

An object of this invention is to devise apparatus for arranging containers horizontally and in sequence which is equally suitable for dealing with containers of large or small cross-section, which is efficient and which handles containers sufficiently gently.

Another object is to produce relatively economical apparatus which is structurally simple and can easily and quickly be adapted to the size of the particular containers involved.

SUMMARY OF THE INVENTION

The above and other objects are achieved by providing apparatus for arranging elongated containers horizontally and in sequence, comprising a hopper supplied with loose containers, the bottom of the aforesaid hopper consisting of a conveyor belt which carries the loose containers towards the foot of an ascending branch of at least one elevator having pick-up teeth each having a seating on which, on the ascending branch of the elevator, the containers are caused to lie horizontally and are manoeuvred by associated pushing devices, a drum near to the top of said at least one elevator which has a housing arranged to move in phase with the pick-up teeth so that containers can be transferred from one to the other, and rotating arms relatively staggered either angularly or heightwise below the top of the elevator near the drum are positioned to pass between each successive pick-up tooth of the ascending branch so as to either lay down or eject from the elevator containers picked up by the pick-up teeth, which are in incorrect positions.

BRIEF DESCRIPTION OF THE DRAWINGS

There now follows a detailed description, to be read with reference to the accompanying drawings, of apparatus embodying the invention, for arranging containers e.g. phials, bottles and the like, horizontally and in sequence. It will be realised that this apparatus has been selected for description to illustrate the invention by way of example and that the invention may reside in any novel feature of the apparatus singly or in combination with other features.

In the accompanying drawings:

FIGS. 3 and 4 show part of the apparatus in FIG. 1, in various situations involving a container which has been picked up by pick-up teeth of the apparatus in an incorrect position;

FIGS. 3'a and 3"a, show correction of the situation shown in FIG. 3, in sequence and are front views in elevation which illustrate how rotating rods of the apparatus resolve such a situation;

FIGS. 3'b and 3"b are plan views corresponding to FIGS. 3'a and 3"a;

FIGS. 4'a and 4"a and FIGS. 4'b and 4"b are similar to FIGS. 3'a and 3"a and 3'b and 3"b and show correction of the situation shown in FIG. 4;

FIG. 5, is a plan view partially sectioned and with parts broken away showing a rotor having the above mentioned rods;

FIG. 6 is a vertical section view of the same rotor, on the line VI—VI of FIG. 5; and FIG. 7 is a diagrammatic longitudinal vertical section view through one of the aforesaid pick-up teeth.

DESCRIPTION OF THE PREFERRED EMBODIMENT

Figure 1:
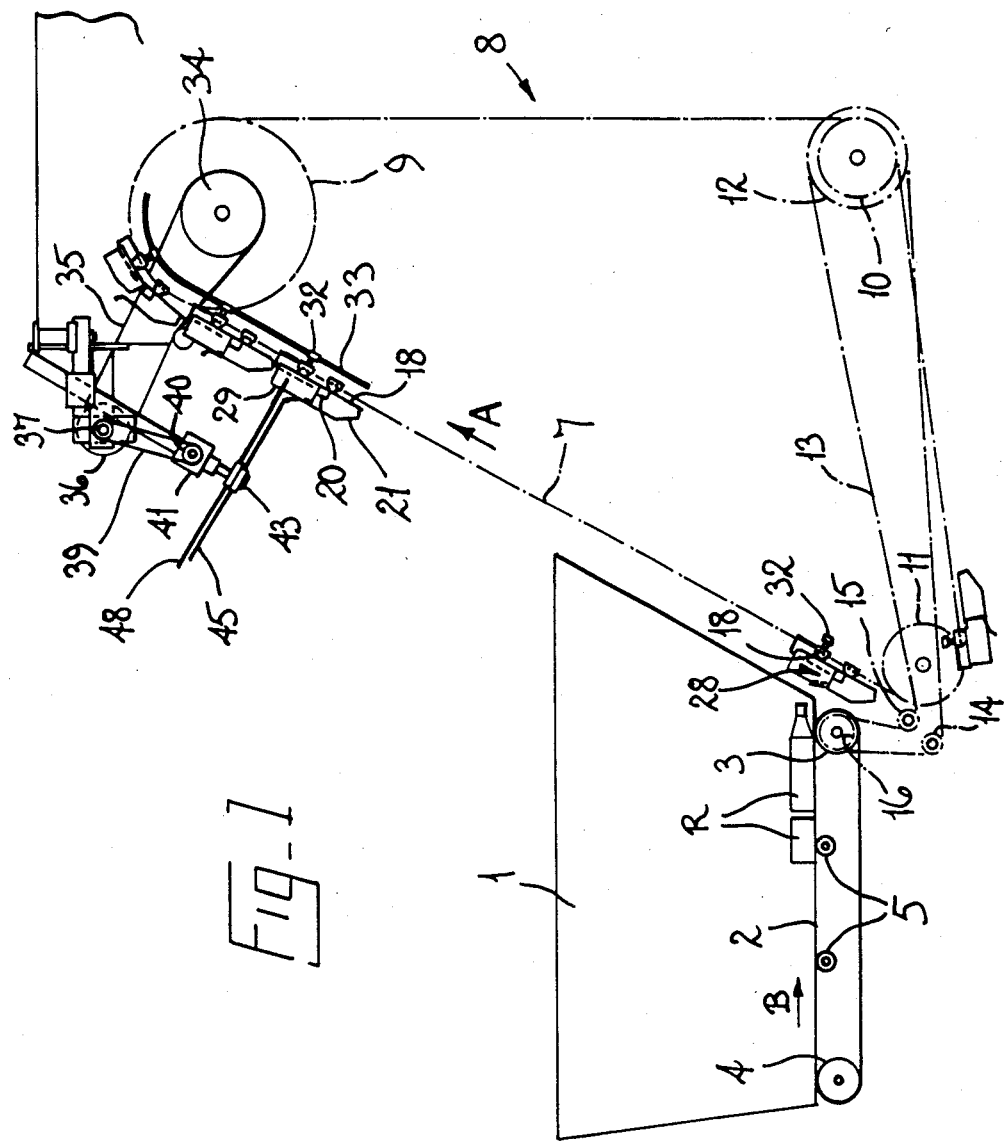
FIG. 1 shows the apparatus in diagrammatic form in side elevation.
Figure 2:
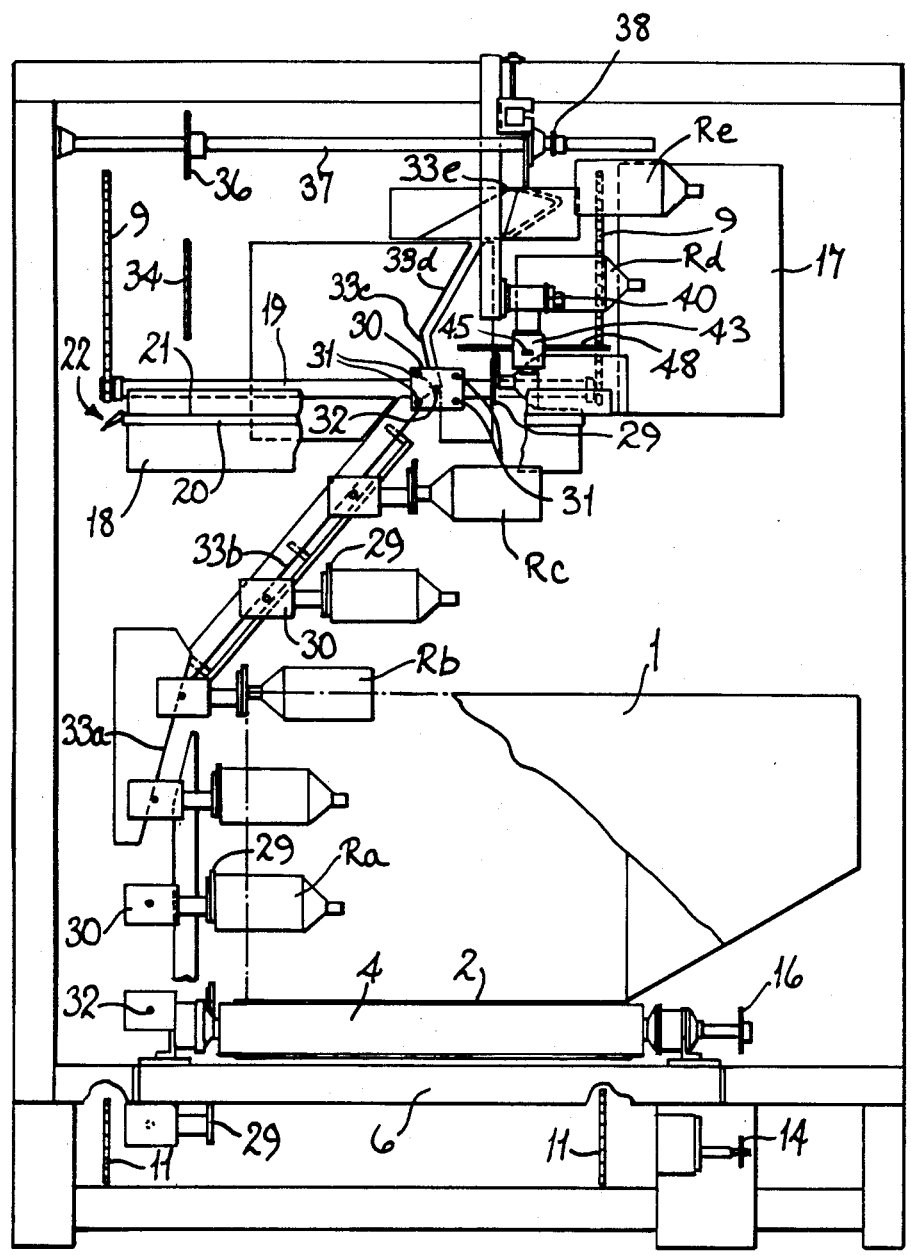
FIG. 2 is a diagrammatic view of the apparatus, with parts broken away, in front elevation.

Referring first to FIGS. 1 and 2, the apparatus embodying the invention for arranging elongated containers such as bottles, phials and the like horizontally and in sequence comprises a hopper 1, into which containers R, open and empty, are fed randomly. The bottom of the hopper 1 consists of a conveyor belt 2 an upper part of which defines a substantially horizontal plane. The conveyor belt 2 has its own drive roller 3, driven roller 4 and small upper support rollers 5 mounted for rotation on a frame 6 of the apparatus. The frame 6 is pivotally mounted coaxially with the roller 3 so that the frame 6 can be adjusted angularly about the horizontal axis of the roller 3. With this frame locked in a desired angular position, the upper plane of the belt 2 assumes a desired substantially horizontal position and the ascending branch 7 of an elevator 8 is inclined at a suitable angle to the upper plane of the belt 2. Although the apparatus described with reference to the drawings has only one elevator 8, an otherwise similar apparatus embodying the invention may have two elevators 8. The elevator 8 comprises a pair of endless link chains continuously travelling in the direction of arrow A; the pair of chains pass round a pair of upper wheels 9 and around two pairs of lower wheels 10 and 11. The pair of toothed wheels 10 drive the elevator 8; the pair of toothed wheels 11, from which the ascending branch 7 emerges, is situated slightly below the drive roller 3 of the belt 2 and is closer to the wheels 11 than the pair of wheels 10.

Also keyed onto the same shaft as the wheels 10 is a toothed wheel 12, around which a chain 13 passes. This chain passes round pinions 14, 15 and a lead wheel 16 which is keyed to the roller 3. The transmission between the wheels 10 and the roller 3 is such that the belt 2 moves in the direction of arrow B, at a speed at least equal to, and preferably greater than, that of elevator 8. The upper plane of the belt 2 moves in a direction which piles up the containers R against the ascending branch 7 of the elevator 8. As shown in FIG. 1, this ascending branch 7 is inclined, but close to the vertical; in FIGS. 3 and 4, this branch is perfectly vertical: in this case it is better if, instead of the two lower pairs of wheels 10 and 11, there is only one pair of lower wheels of the same diameter as the wheels 9.

Near to one of the top wheels 9 of the elevator 8 is a drum 17 (FIGS. 2,3',3",4' and 4"), which is co-axial with these wheels and which rotates integrally with them. Even if the equipment has two elevators 8, there is only one drum 17, which is situated between the uppermost points of the two elevators; in this latter case the hopper 1 is divided into two sections each corresponding to its respective elevators 8 and these are appropriately served by the conveyor belt 2.

Carried between the pair of chains of the elevator 8 are a plurality of flat parts 18 (FIGS. 1,2,3,4 and 7) each with a corresponding bracket 19 (FIG. 2). The units and brackets 18,19 are distributed at regular intervals along the chains, with brackets 19 being slightly displaced towards the inside of the elevator 8 in relation to the corresponding flat units 18. Projecting outwardly from each of these latter units, is an associated tubular rod 20, extending transversely of the elevator and thus longitudinally to the unit itself. Fixed onto the rod 20 by a quick release mechanism 22 is a unit 21 of t-shaped cross-section. At one end portion of the unit 21, in an upper crosspiece of the t part is a tongue 21a (FIG. 7), bent in a hook shape towards the opposite end of the unit 21.

The tongue 21a engages in a hole 20a, in the associated rod 20 (which extends transverse to the elevator 8) the hole 20a being at the opposite end in the wall of the rod which, on the ascending branch 7, faces upwards.

Above and against this wall the upper crosspiece of the aforesaid t is clamped by quick-release mechanism or locking device 22, fitted with a quick-acting lever with a cam restrainer. A device of this kind, shown in FIG. 7 and produced by Camloc, is fitted between the ends of the rod 20 of each unit 21 opposite those of the coupling provide by the tongue 21a and gap 20a. The device 22 comprises a lever 23, which can be adjusted for length by means of a screw, and which terminates in a hook 23a for engaging with a hook 21b formed from the upper crosspiece of the t of the unit 21. The lever 23 is mounted by pivot 24 to a sort of handle 25, which also acts as a cover for the device and which in turn is mounted by pivot 26 to a small support 27, projecting from the rod 20. The unit 21, which can be exchanged to suit the size of the containers can then be speedily locked and unlocked to the associated rod 20 and remains firmly and securely locked to this. Above the rod 20 the t unit 21 defines a sort of pick-up tooth having a front portion providing a seating 28 which is defined at the rear by the associated flat unit 18 and extends horizontally. Below the rod 20, the t unit 21 forms the shape of a fairing which terminates abutting the flat unit 18. The seatings 28 of the single elevator 8 or of both elevators are gradually brought into alignment with horizontal housings, (not shown) at the periphery of the drum 17.

In a substantially well known manner, movable longitudinally of, and lying within each seating 28 there is a pushing device 29 mounted for sliding reciprocation and which, by means of an arrangement of arms at right angles, is supported in a cantilever fashion by a associated small plate 30 (FIG. 2). By means of a set of four small rollers 31, each small plate 30 is mounted for sliding movement on the associated bracket 19. At the rear of each small plate 30 is a small roller 32, which engages a stationary cam unit 33. The cam unit 33 as can be seen in FIG. 2 comprises, along the ascending branch 7 of the elevator, different operative sections, which, from bottom to top, are respectively shown as 33a-b-c-d-e and which cause the pushing device 29 to progressively approach the drum 17. Obviously, along the other branches of the elevator, sections of the cam unit 33, not shown, cause the pushing device 29 to return to the position furthest from the plane of this drum. Also keyed onto the same horizontal shaft to which the wheels 9 are keyed is a wheel 34 round which a chain 35 passes, the chain 35 also passing round a wheel 36, keyed onto a shaft 37 which is parallel to the preceding one. Onto the shaft 37, depending on whether there are one or two elevators 8, are keyed one or two pinions 38; a chain 39 passes round each pinion 38 and round a pinion 40, which forms the input to an associated mitre wheel gear unit housed in a box 41. Each box 41 is adjustably supported by an arrangement of perpendicular arms and the output from the mitre wheel gearing unit is small shaft 42 (FIGS. 5 and 6), to which a rotor 43 can be secured. The axis of the small shaft 42 and rotor 43 is substantially parallel to and disposed outwardly of the course taken by the ascending branch 7 of the respective elevator and this rotor is situated near to the lower part of the drum 17.

The transmission between the wheel 34 and the small shaft 42 is such that one complete revolution of this small shaft 42 and the rotor 43 corresponds to the passage of two successive seatings 28. Rotor 43 comprises a lower support 44, which is disc shaped and comprises a diametric channel 44a for housing the central section of an associated arm, namely plastic rod 45: peripherally, and in positions diametrically opposite with respect to channel 44a, are disposed slots 44b, curved concentrically to the support itself, and which pass through support 44. Through these slots screws 46 pass. The screws 46, being threaded into holes threaded in an upper disc-type support 47, clamp thereto the lower support and thus the rod 45: by virtue of the slots 44b the relative clamping position of the two supports is adjustable angularly around the axis passing through the centres thereof, thus to adjust the relative angular positions of the rods. Support 47 also comprises downwardly facing channel 47a for housing the central section of an upper arm, namely plastic rod 48, which is clamped by tightening the two supports 44, 47 together. As the drawings show, the two rods 45 and 48 are slightly staggered angularly with respect to each other. The assembly comprising the two supports 44, 47 is then clamped, in an adjustable angular position, to the small shaft 42, by means of a sleeve 49 keyed to the shaft 42, the sleeve having a flange at the bottom; a ring clamp 51 anchors the assembly comprising the two supports 44,47 to this flange by means of screws 50.

The operation of the apparatus is summarised with reference to FIGS. 1 and 2 assuming that the pick-up teeth of the elevator 8 pick-up the containers correctly. The elevator is capable of dealing with containers R which have relatively small or large cross-sections provided that it has been fitted with t units 21 which correspond to the size of the containers which are to be handled. The conveyor belt 2 piles up the containers against the ascending branch 7 of the elevator, which is substantially near to the vertical; the containers are fed into hopper 1 in a controlled way so that there is only a limited number of containers on the belt 2 at any one time. Whilst the seatings 28 of the pick-up teeth are in the region facing the exit of the hopper 1, they are free from the associated pushing device 29, which is at the end of the seatings opposite to drum 17. At this region, one or more containers may enter seating 28 of a pick-up tooth and be laid down in it, disposed longitudinally with respect to this seating. A container, lying down, is stationary in the seating until it is engaged by the associated pushing device 29; container Ra in FIG. 2 is in this situation. A container which has lain down may have its neck pointing either one way or the other. As seatings 28 are gradually lifted as the ascending branch of the elevator rises, pushing devices 29 move horizontally in the direction of drum 17 and push before them any containers which the teeth have picked up, so the container in contact with the pushing device gradually assumes positions Rb, Rc, Rd and Re; when it reaches the last mentioned position it is almost completely inserted into a corresponding housing in the drum 17.

Obviously, if there is a further container lying in seating 28, it is ejected therefrom before the seating arrives opposite the drum 17 (see bottom part of FIG. 3'a) and falls back into the hopper 1.

As shown in FIG. 3, as sometimes happens, a container R'1 manages to get to a position close to the drum 17 still almost vertical, in other words with its bottom between seating 28 of the relative pick-up tooth and plate 18, whilst its neck faces upwards: R'1 is, as it were, lodged between the upper portion of t unit 21 of this pick-up tooth and the fairing of the unit 21 of the tooth immediately above (the preceding one).

Rotor 43 rotating in direction C, causes the upper rod 48 to come into contact with the neck of container R'1 (FIGS. 3,3'a and 3'b) and then lays it down in seating 28 (FIGS. 3"a and 3"b, where the container is shown as R"1) so that it can subsequently be inserted in the housing of drum 17, or ejects it from this seating causing it to fall into hopper 1. Shortly afterwards lower rod 45 arrives (FIGS. 3"a and 3"b), but the problem has already been sorted out and the rod continues on its way without interfering with the t unit 21 which is being raised by the elevator 8.

A container R'2 may on the other hand have become stuck with its neck between pushing mechanism 29 of seating 28, by which it has been picked up, and the fairing of the t unit 21 immediately above (FIGS. 4, 4'a and 4'b).

When upper rod 48 arrives it does not contact the container; the lower rod 45, however, does come into contact with the neck of the container which in the mean time has been lifted by the pick-up tooth carrying it. The lower rod 45 ejects the container from the pick-up tooth (see FIGS. 4"a and 4"b, in which the container being ejected is shown as R"2).

Having thus described our invention, what we claim as new and desire to secure by Letters Patent of the United States of America is:

1. Apparatus for arranging elongated containers horizontally and in sequence, comprising a hopper supplied with loose containers, the bottom of the aforesaid hopper consisting of a conveyor belt which carries the loose containers towards the foot of an ascending branch of at least one elevator having pick-up teeth each having a seating on which, on the ascending branch of the elevator, the containers are caused to lie horizontally and are maneuvered by associated pushing devices, a drum near to the top of said at least one elevator which has a housing arranged to move in phase with the pick-up teeth so that containers can be transferred from one to the other, and rotating arms relatively staggered either angularly or heightwise, below the top of the elevator near the drum and disposed in a plane substantially normal to and transverse to said ascending branch of said elevator and are positioned to pass between each successive pick-up tooth of the ascending branch so as to either lay down or eject from the elevator containers picked up by the pick-up teeth, which are in incorrect positions.

2. Apparatus according to claim 1 wherein the ascending branch of the elevator is close to the vertical, while the upper part of the conveyor belt lies in a substantially horizontal plane.

3. Apparatus according to claim 1 wherein the speed at which the aforesaid conveyor belt moves is arranged to be at least equal to that at which the aforesaid elevator moves.

4. Apparatus according to claim 1 comprising a rotor having two of the aforesaid arms mounted beneath the rotor, the axis of the rotor being substantially parallel to and outwardly of the aforesaid ascending branch, the rotor being arranged to perform a complete revolution during the passage of two successive pick-up teeth, the two arms being slightly staggered angularly with respect to one another and the higher arm being arranged to precede the lower one in intersecting the aforesaid ascending branch.

5. Apparatus according to claim 4 wherein the arms are rotated by the motion of the elevator.

6. Apparatus according to claim 4 wherein the rotor comprises a pair of supports for the arms which are clamped one to the other for adjustment relative to one another about the axis of the rotor.

7. Apparatus according to claim 1 wherein each of the pick-up teeth is mounted on an associated crosspiece of the elevator by a quick-release mechanism.

* * * * *